(12) United States Patent
Ganjali et al.

(10) Patent No.: US 11,895,013 B1
(45) Date of Patent: Feb. 6, 2024

(54) SYSTEMS AND METHODS TO MIGRATE A VIRTUAL SUB-NETWORK

(71) Applicants: HUAWEI TECHNOLOGIES CANADA CO., LTD., Kanata (CA); The Governing Council of the University of Toronto, Toronto (CA)

(72) Inventors: Yashar Ganjali, Kanata (CA); Zhenhua Hu, Kanata (CA); Sepehr Abbasi Zadeh, Kanata (CA); Soheil Abbasloo, Toronto (CA); Parsa Pazhooheshy, Toronto (CA); Farid Zandi, Toronto (CA)

(73) Assignees: HUAWEI TECHNOLOGIES CANADA CO., LTD., Kanata (CA); THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 0 days.

(21) Appl. No.: 18/099,701

(22) Filed: Jan. 20, 2023

(51) Int. Cl.
*H04L 45/00* (2022.01)
*H04L 45/02* (2022.01)
*H04L 41/084* (2022.01)

(52) U.S. Cl.
CPC ............ *H04L 45/22* (2013.01); *H04L 41/084* (2013.01); *H04L 45/02* (2013.01)

(58) Field of Classification Search
CPC ........ H04L 45/22; H04L 41/084; H04L 45/02
See application file for complete search history.

(56) References Cited

U.S. PATENT DOCUMENTS

| | | | |
|---|---|---|---|
| 5,251,205 A * | 10/1993 | Callon | H04L 9/40 370/392 |
| 10,924,346 B1 * | 2/2021 | Banerjee | H04L 41/0813 |
| 11,093,549 B2 * | 8/2021 | Banerjee | H04L 41/22 |
| 2010/0201682 A1 * | 8/2010 | Quan | G06T 15/04 382/173 |
| 2013/0279365 A1 * | 10/2013 | Hui | H04L 45/03 370/252 |
| 2016/0378550 A1 * | 12/2016 | Bertran Monfort | G06F 9/4843 718/102 |

* cited by examiner

*Primary Examiner* — Michael Won (57) ABSTRACT

In cloud computing, for various reasons such as load-balancing, hotspot elimination, server consolidation, energy and cost savings, and system maintenance, there is a need to migrate a virtual sub-network of virtual entities from a source network of servers to a destination set of servers. Existing migration methods are limited to the migration of VM memory and controller states, where network entities are migrated individually. Embodiments of this disclosure include systems and methods for the stateful live migration of a multi-layer network, while maintaining live state convergence and consistency, and preventing network connection losses, packet disordering and packet drops.

16 Claims, 4 Drawing Sheets

SYSTEMS AND METHODS TO MIGRATE A VIRTUAL SUB-NETWORK

CROSS-REFERENCE TO RELATED APPLICATIONS

This is the first application filed for the present invention.

TECHNICAL FIELD OF THE INVENTION

This application pertains generally to the migration of virtual entities between distinct sets of physical infrastructure, and in particular to methods and systems for migrating a set of virtual entities from one set of servers to another while maintaining sufficient resources to allow for the execution of an application.

BACKGROUND

Within a cloud network, a network gateway may be implanted as a highly coupled set of virtual entities typically referred to as virtual network functions (VNFs). VNFs can be implemented in a number of different ways including through the use of slicing techniques to provide virtualized representations of a dedicated computing device, through the use of software executed on a virtual machines, or through the execution of software within a container. Typically, within a network, packets are directed through a network of chained VNFs each of which carries out a different function. This allows for any number of different packet treatment protocols to be carried out by a distributed set of functions. A network of virtual entities such as VNFs is referred to herein as a virtual sub-network (VSN).

Changing the computing resources used to instantiate a VNF is referred to as migration. Migrating a VNF from a first set of network resources to another set of resources can include the migration of the state information so that the migrated VNF appears to be substantially identical when it is moved. Migrating virtual entities may be performed for any number of different reasons, including planned events like upgrades, unplanned events like mitigating the effects of natural disasters on the VSN, or load balancing to avoid hot spots within the network related to traffic, processing or other resource usage. The migration of a VSN may be a partial or full migration. In a full VSN migration, all virtual entities within the VSN are migrated, while in a partial migration only some of the virtual entities are migrated, resulting in a VSN that may span different pools of resources. These different resources may reside within the same data center, or they may be located at entirely different geographical areas.

In the prior art, methods for migrating virtual entities tend to focus on migrating individual VNFs. This may entail movement of a given VM or container to effect to migration of the VNF. However, within some VSNs, a VNF focused migration procedure may not be sufficient to meet VSN service requirements. Within a VSN there may be VNF inter-dependencies that can be significantly affected by the migration of individual virtual entities without accounting for their relationship with other entities within the VSN. Failure to account and accommodate for these interdependencies can result in a number of different problems including out of order processing or delivery of packets, and failure to maintain the state of the components within the VSN.

Existing methods of virtual entity migration are not necessarily applicable to VNFs that have functionalities more complicated than simple packet switching. Furthermore, quality of service guarantees associated with the functioning of a VSN may significantly restrict decisions associated with when, where and how migrations of VNFs within the VSN can be carried out. For instance, the lack of capabilities such as flexible buffering mechanisms, or on-demand end-to-end connection establishment at the hardware level, can restrict the design options.

Therefore, there is a need for methods and systems allowing a virtual sub-networks, or at least some of the constituent VNFs within the VSN, to be migrated from one physical location to another while allowing the functioning of the VSN during the migration while meeting service level guarantees.

This background information is provided to reveal information believed by the applicant to be of possible relevance to the present invention. No admission is necessarily intended, nor should be construed, that any of the preceding information constitutes prior art against the present invention.

SUMMARY

Embodiments of the present invention include methods and systems for migrating a VSN in a live manner, while maintaining state consistency of virtual entities at its nodes. By configuring a VSN replica, and for each source virtual entity, stopping it from processing traffic packets, transferring its states to a virtual entity replica of the VSN replica via a state tunnels, and redirecting traffic packets to be processed by the virtual entity replicas of the VSN replica via a traffic tunnel, the VSN replica effectively becomes a migrated VSN, without an application running on the virtual entities being disrupted.

Technical benefits of embodiments over prior art include a VSN migration where network states and packets are not lost, virtual entities reach their destination in a finite amount of time, network states are consistent, and packets remain ordered as intended. Overall, an efficient and consistent orchestration across many levels of the DAG-structured VSN can be ensured, which allows embodiments to be used reliably when a virtual network must be moved, in order to allow upgrades or to prevent undesired downtime.

Embodiments of the present disclosure include a method of migrating a virtual sub-network (VSN) of source virtual entities for processing traffic packets from a source network of servers to a destination network of servers, by an orchestrator, the method comprising: selecting a source virtual entity from the VSN for migration to the destination network of servers, the VSN structured as a direct acyclic graph (DAG) and the selected source virtual entity being a leaf node within the DAG; transmitting an instruction to a destination local migration agent (LMA) at the destination network of servers to instantiate a virtual entity replica at the destination network of servers corresponding to the selected source virtual entity; transmitting an instruction to both a source LMA at the source network of servers and the destination LMA, to configure, between the selected source virtual entity and the virtual entity replica, a state tunnel for transferring a set of state parameters, and a traffic tunnel for transferring traffic packets; transmitting an instruction to the source LMA to stop the selected source virtual entity from processing traffic packets; transmitting an instruction to the source LMA to transfer, via the state tunnel, a set of state parameters of the selected source virtual entity, to the virtual entity replica; transmitting an instruction to the destination LMA to configure the virtual entity replica using the set of state parameters transferred via the state tunnel and to instruct the virtual entity replica to process traffic packets; and transmitting an instruction to the source LMA to redirect traffic packets addressed to the selected source virtual entity over the traffic tunnel to the virtual entity replica.

A method according to an embodiment can further comprise removing the selected source virtual entity from the DAG and repeating the method until a replica of the VSN has been instantiated and configured at the destination network of servers.

In a method according to an embodiment, instantiating a virtual entity replica at the destination network of servers can comprise transmitting a request for processing resources and networking resources to a resource manager at the destination network of servers, and instantiating the corresponding virtual entity replica on resources allocated in response to the transmitted request.

In a method according to an embodiment, at least one of the source virtual entities can be a virtual network function (VNF).

A method according to an embodiment can further comprise directing the destination LMA to buffer traffic packets received from the destination LMA's traffic tunnel.

A method according to an embodiment can further comprise directing the destination LMA to buffer traffic packets received from the destination LMA's state tunnel.

In a method according to an embodiment, the state tunnel and the traffic tunnel can be configured to transfer data with a priority greater than the priority of regular packet traffic in the source network of servers and the destination network of servers.

A method according to an embodiment can be performed over a time interval for each virtual entity and the time interval for each entity can overlap with a time interval for another entity.

In a method according to an embodiment, each destination LMA can be configured to determine whether a traffic packet is from a state tunnel or a traffic tunnel.

In a method according to an embodiment, each destination LMA can be configured to determine which source node of the VSN a traffic packet is received from.

A method according to an embodiment can further comprise selecting a second source virtual entity from the VSN in response to receipt of a prompt from the selected source virtual entity indicating that it has been migrated to the destination network; and repeating the steps of transmitting an instruction for the selected second source virtual entity.

A method according to an embodiment can further comprise transmitting an instruction to the destination LMA to verify that all state parameters from the source virtual entity have been received prior to instructing the virtual entity replica to begin processing traffic packets.

A method according to an embodiment can further comprise transmitting an instruction to the destination LMA to allow each virtual entity replica to process buffered traffic packets obtained from the corresponding tunnel.

In a method according to an embodiment, at least one of the source virtual entities can be a virtual machine (VM).

Embodiments of the present disclosure include system for supporting and migrating a virtual sub-network (VSN) of source virtual entities for processing traffic packets, from a source network of servers to a destination network of servers, the system comprising a source local migration agent (LMA) at the source network of servers; a destination LMA at the destination network of servers; and a machine readable memory for storing instructions, and at least one processor for executing instructions stored in the memory that when executed, configure the at least one processor to: select a source virtual entity from the VSN for migration to the destination network of servers, the VSN structured as a direct acyclic graph (DAG) and the selected source virtual entity being a leaf node within the DAG; transmit an instruction to a destination local migration agent (LMA) at the destination network of servers to instantiate a virtual entity replica at the destination network of servers corresponding to the selected source virtual entity; transmit an instruction to both a source LMA at the source network of servers and the destination LMA, to configure, between the selected source virtual entity and the virtual entity replica, a state tunnel for transferring a set of state parameters, and a traffic tunnel for transferring traffic packets; transmit an instruction to the source LMA to stop the selected source virtual entity from processing traffic packets; transmit an instruction to the source LMA to transfer, via the state tunnel, a set of state parameters of the selected source virtual entity, to the virtual entity replica; transmit an instruction to the destination LMA to configure the virtual entity replica using the set of state parameters transferred via the state tunnel and to instruct the virtual entity replica to process traffic packets; and transmit an instruction to the source LMA to redirect traffic packets addressed to the selected source virtual entity over the traffic tunnel to the virtual entity replica.

Embodiments of the present disclosure include an orchestrator for supporting and migrating a virtual sub-network (VSN) of source virtual entities for processing traffic packets, from a source network of servers to a destination network of servers, the orchestrator comprising a network interface for transmitting and receiving data, a machine readable memory for storing instructions, and at least one processor for executing instructions stored in the memory that when executed, configure the orchestrator to select a source virtual entity from the VSN for migration to the destination network of servers, the VSN structured as a direct acyclic graph (DAG) and the selected source virtual entity being a leaf node within the DAG; transmit an instruction to a destination local migration agent (LMA) at the destination network of servers to instantiate a virtual entity replica at the destination network of servers corresponding to the selected source virtual entity; transmit an instruction to both a source LMA at the source network of servers and the destination LMA, to configure, between the selected source virtual entity and the virtual entity replica, a state tunnel for transferring a set of state parameters, and a traffic tunnel for transferring traffic packets; transmit an instruction to the source LMA to stop the selected source virtual entity from processing traffic packets; transmit an instruction to the source LMA to transfer, via the state tunnel, a set of state parameters of the selected source virtual entity, to the virtual entity replica; transmit an instruction to the destination LMA to configure the virtual entity replica using the set of state parameters transferred via the state tunnel and to instruct the virtual entity replica to process traffic packets; and transmit an instruction to the source LMA to redirect traffic packets addressed to the selected source virtual entity over the traffic tunnel to the virtual entity replica.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible

BRIEF DESCRIPTION OF THE DRAWINGS

It will be noted that throughout the appended drawings, like features are identified by like reference numerals.

DETAILED DESCRIPTION

Typically, a cloud environment is hierarchically divided into smaller parts, such as available zones and cells. An update to software or hardware, or other such planned network events, in one of these zones or cells does not typically impact the resources of other cells. While a network event may interrupt processing carried out by virtual entities instantiated within the computing, storage and connectivity resources within the zone or cell, virtual entities instantiated upon the resources of another cell or zone are typically not impacted by such network events. Migration of a virtual entity from a first set of resources to a second set of resources, in a different zone or cell, can be performed so that the virtual entity is not impacted by these network events. So long as the migration can be planned, the network event can be considered a planned network event. A temporal variation in the network or processing load in a given zone or cell, or in a given server, may require migration of a subset of the virtual entities supported by the zone, cell, or server. A natural disaster, such as a flood or a storm, may require an emergency shutdown of an entire data center and requiring the migration of all supported virtual entities to other data centers. This ability to migrate network functions can also be used to allow for load balancing across computing, storage, and network resources. However, when a set of virtual entities within a cloud environment are interconnected with strict performance requirements that have to be met to allow continued interoperability, migration of any of the virtual entities requires a migration process that minimizes, and possibly eliminates, virtual entity downtime during this migration.

A network function (NF) is an element within a network that carries out a particular function. In some implementations, an NF may be a hardware element that is designed specifically to carry out a particular function, such as routing or switching. In other implementations, an NF can be provided by software executed on a more general purpose computer that carries out a particular function, such as deep packet inspection or rule processing. In telecommunications networks, some NFs may also act as gateways among other functions.

A virtual network function (VNF) is a virtualized NF. The virtualization of an NF can be carried out in a number of different ways. A hardware implemented or accelerated NF may be sliced to create a series of virtualized versions of the NF. NFs that are implemented as software executed on a general purpose computer may be implemented making use of the pooled resources of a data center. This can allow for data center resources to be allocated to a virtualized NF that from the perspective of other network entities is indistinguishable from a standalone dedicated NF. Within the data center a number of different techniques can be used including providing a VNF using a virtual machines (VM) or a container. A VM is a logical construct in which virtualized representations of the hardware defining a computer are instantiated. In addition to processing and storage resources, network interfaces and other such resources are defined. An operating system can then be executed within the virtual machine, as can the software required to carry out the processes required by the NF. Within a virtualization environment, a hypervisor is typically employed to both create VMs and to ensure that the resources allocated to a VM are isolated from the resources accessible to other VMs. While the use of hypervisors and VMs require the allocation of processing and storage resources to what can be characterized as administrative overhead, the isolation of VMs may be advantageous to some VNF implementations. Containers are an alternate virtualization technology that reduce the resource overhead associated with VMs, by grouping together a set of related processes that run on a shared kernel in isolation from other containers. Processes within a container do not typically see the other processes running on the underlying operating system, and thus are effectively isolated from other containers. A container has limited access to the hardware on which the underlying OS is executed, and this access is mediated by the OS. This is in contrast to a VM which has access to isolated resources allocated by the hypervisor. While the use of containers is less resource intensive, it does not provide the strict resource isolation that is provided by a VM. It should be understood that while both VMs and containers are common tools for implementing a VNF, they are by no means the only manner in which to do so. Examples of functions that can be provided through the user of VNFs include network address translation (NAT), deep packet inspection (DPI), and load balancing. It should be understood that in some embodiments, NFs and VNFs may both be used within a network without other network entities being able to differentiate between VNFs and non-virtual NFs. A VNF is one of many different types of virtual entities.

Some VNFs are provided as virtualized versions of dedicated hardware, in which the different virtualized versions are created through techniques referred to as slicing. Slicing is a virtualization technique in which a network function has its resources used to create a plurality of distinct virtualized network functions. Where a network function is provided through software executed on general purpose hardware, multiple instances of the software can be executed on the hardware, either within distinct VMs, or within containers. Where the network function is provided through a specialized hardware element, such as a switch or router, slicing allows the single element to appear as a series of distinct virtual elements within the same or different networks. Sliced instances of a network function appear indistinguishable from other network functions, and one sliced instance of a network function only see other sliced instances of the same network function as distinct network functions.

A stateful VNF is a VNF that maintains state information (e.g., a set of parameters) that can change over time, or as a result of each operation. This state information may be relied upon for the proper functioning of the VNF, or the functioning of the VNF in relation to other functions within the VSN. The state of the VNF can be defined by a set of parameters that can be stored in a memory. Loss of a state can result in VNF malfunction. Maintaining these state parameters can be referred to as maintaining state consistency. The VNF state information can be stored so that the state of a VNF can be restored at a future time. Transfer of the state information of a first VNF can be used to put a second VNF into the same state as the first VNF when the state information was saved. For example, if a first VNF is of a specific VNF type such as a packet analyzer, the state information of this first VNF can be provided to allow a second VNF of the same type to put the second VNF into the same state as the first VNF.

While a VNF is typically used to carry out a single function, a set of VNFs or other such virtual entities can be grouped together to form a virtual sub-network (VSN). A VSN can carry out a complex task by having a set of VNFs each of which carries out a constituent portion of the complex task. By having a number of different VNFs carrying out portions of the overall task, a VSN can be designed to load balance portions of a complex task by having a set of parallel VNFs carrying out the same smaller task. Different VNFs within the same VSN can be instantiated upon different processing and storage resources to help avoid bottlenecks.

Embodiments of the present invention include methods and systems for live migration of a VSN, while maintaining the state consistency of its virtual entities. In some examples, the virtual entities of the VSN are VNFs, however, methods and systems of the present invention can apply to virtual entities other than VNFs.

Because VNFs within a VSN are typically designed to receive data, perform a function, and transmit data to a subsequent VNF, they can be modelled as graphs comprising nodes (also referred to as vertices) that are connected by edges. In these models, both the nodes and the edges are considered to be important elements. When the edges are directional, that is that data flows between two nodes only in a defined direction, the directionality is typically represented by arrows linking the nodes. A Graph with directional connections can be referred to as a directed graph. In some graphs, the arrangement of nodes and directional edges allows for the creation of cycles, or loops. Typically, this can be described by indicating an order to the nodes, and allowing the output of a node to go to an earlier node in the graph. Another form of a graph is referred to as a directed acyclic graph (DAG). In a DAG, links between nodes are directed, in that a direction of data flow is indicated. Additionally, the nodes and edges of a DAG are acyclic in that a loop or cycle is not possible. Typically, this can be described by indicating an order to the nodes, and preventing the output connection from a node to pass to a higher ordered node. A VSN that can be modeled as a DAG will have VNFs positioned at nodes, and connections between the nodes represented by edges. The directed edge may represent the network packet routing direction between a VNF and its subsequent VNF, and accordingly, there should be no loop or cycle in a VSN as a DAG. The methods and systems discussed are primarily focussed on their applications to VSNs that can be modeled as a DAG.

Figure 1A:
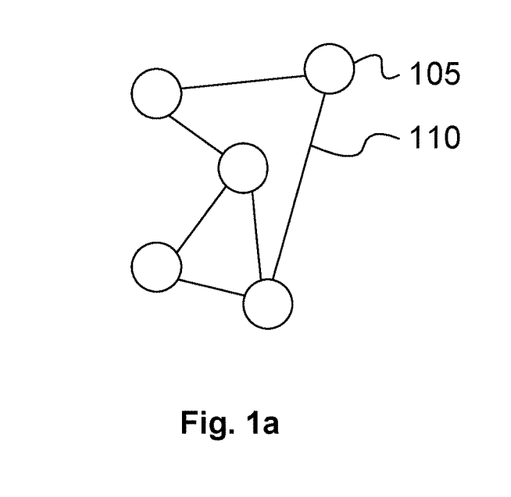
FIGS. 1a-1e illustrate a system architecture for realizing live migration of a stateful VSN, according to an embodiment.

FIG. 1a is an example of a representation of a graph. The graph contains five vertices 105 and six edges 110. If a VSN is represented by the graph of FIG. 1A, each vertex 105 will represent a node, and each edge 110 as a connection between nodes. As can be seen, the graphs of FIG. 1 is non-directional, as there is no defined direction for any of the edges 110.

Figure 1B:
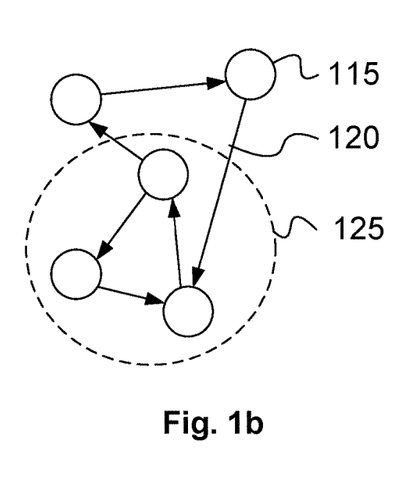

FIG. 1b illustrates a directed graph having five nodes 115 connected by six directional edges 120. For any given node 115, there is at least one edge 120 leading into the node 115 and at least one edge 120 leading out of the node. The graph of FIG. 1b has an internal cycle 125 comprised of three nodes 115 that can create a loop. The overall structure of the graph of FIG. 1b also defines another loop.

Figure 1C:
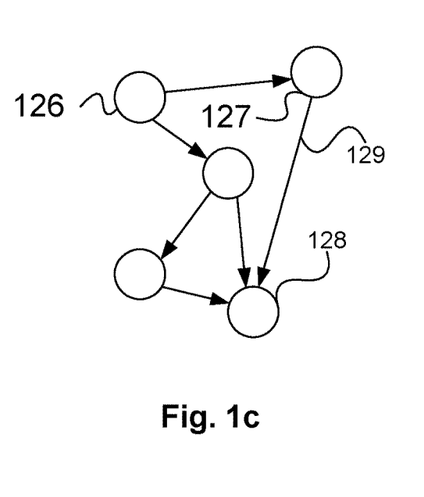

FIG. 1c illustrates an example of a directed acyclic graph (DAG). In contrast to the directed graph illustrated in FIG. 1b, a DAG contains no cycle, such that if it represents a network of NFs or VNFs, each function processes each input to the network once. As illustrated, there is an initial node 126, a set of interim nodes 127, and a terminal node 128. These nodes are connected by directed edges 129. The initial node 126 has no directed edges pointing towards it. Interim nodes 127 have both edges 129 serving as both inputs (pointing towards them) and outputs (pointing away from them). Terminal node 128 has no output edges and at least one input edge 129. In some structures terminal node 128 may also be referred to as a leaf node.

Figure 1D:
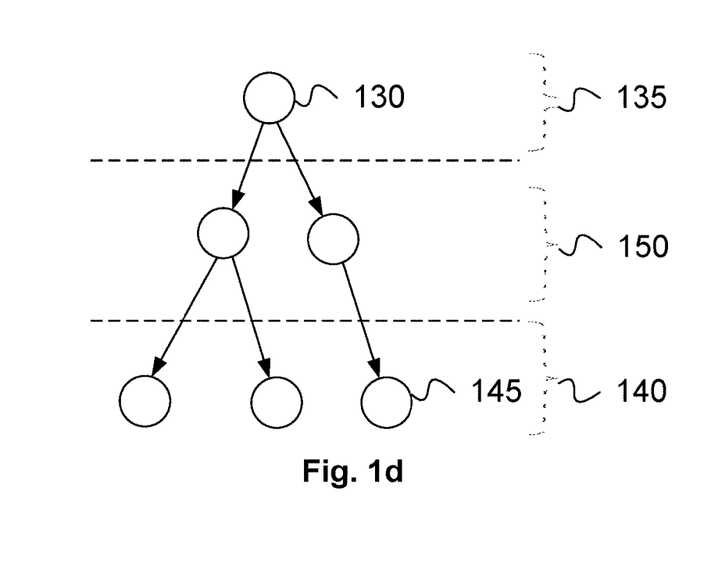

FIG. 1d illustrates a DAG structure referred to as an arborescence, i.e., a tree. A tree is a DAG in which all directed edges lead away from one vertex called the root 130. The tree structure allows for defining levels for the nodes. The lowest level 135 is that of the root node 130, and the highest level 140 is that of final nodes or leaf nodes 145. Although FIG. 1d illustrates a tree with one intermediary level 150, a tree can have any number of intermediary levels. Where a node at a lower level is directly connected to a higher level node, the lower level node can be referred to as a parent node, and the higher level node as a child node. An intermediary node may act as both a parent node and child node. The parent/child relation may be represented by the directed edge between a VNF and its subsequent VNF in a DAG. In the DAG structure illustrated in FIG. 1d, root node 130 is a parent node to the intermediate nodes of level 150. Each of the intermediate nodes of level 150 is a parent node to at least one of leaf nodes 145 of level 140.

Figure 1E:
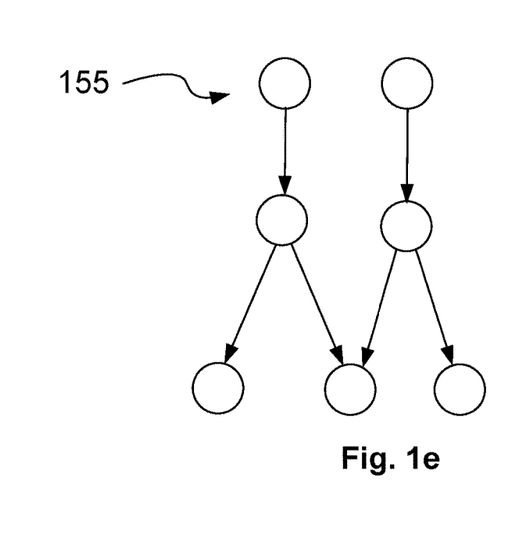

FIG. 1e illustrates a polytree, a structure which may be understood as a set of trees sharing at least one node. A DAG can have a plurality 155 of roots, in which case it is referred to as a polytree. This is merely an example of another kind of DAG, but others exist.

Although a tree and a polytree are illustrated in FIG. 1d and FIG. 1e, these are merely examples of DAGs with which embodiments can be implemented. Methods and systems according to embodiments are not limited to trees and polytrees and can be implemented with DAGs other than trees and polytrees.

When modeling a VSN as a DAG, VNFs of the VSN are represented by nodes of the DAG. Each VNF is typically designed to receive input from a defined set of VNFs and to transmit data to a defined set of VNFs. These input and output connections are represented as edges in the graph. Typically, a root or source node within the DAG receives data, for example a packet from a packet flow. At the root node, processing is performed. This processing may a load balancing operation that selects one of the child nodes, or it may be a process that generates data that is provided along with the received packet to a child node. In some embodiments, a process is performed, and the output of the processing of the received packet is used to determine which child node is next in the VSN. Different functions can be carried out in different levels of positions of the VSN. In this way a packet is processed from the root node, possibly through a number of branches, to a leaf node. As each node processes the packet, the state information associated with the VNF at the given node may change. This change in state may change how subsequent packets are processed, or where subsequent packets are transmitted.

As indicated above, migration of one or more VNFs to a different set of resources may be necessary or desired in a number of situations. The migration of stateful VNFs can be described as a movement of one or more virtual entities in a VSN from a source physical location to a destination physical location, while the change in VNF location remains transparent. To ensure that packets are processed by a migrated VNF in the same manner that they would have been before the migration, proper migration of the state information of the VNF is required. Such a migration of a VNF and its associated state, when performed without taking the VNF or VSN offline, can be referred to as live stateful migration. Typically, the source physical location and the destination physical location are distinct from each other.

Some methods for migrating virtual entities treat the migrating entities as standalone entities that are not interrelated or interdependent upon other virtual entities within a VSN. Because a VSN is comprised of interconnected virtual entities, the migration of an individual entity within the VSN, without regard to the entities to which it is connected can result in a number of problems. In some VSNs, migration of the virtual entities may result in out of order packet handling or dropped packets, which can introduce errors at the level of the VSN that may not be initially apparent at the level of a VNF. In some VSNs, migration of a virtual entity without consideration of the entities to which it is connected can result in processing delays which can exceed established service guarantees. Other such issues related to migrating numerous highly coupled virtual entities will be apparent to those skilled in the art.

The migration of a single entity within a VSN without regard for the interdependencies it has within the VSN may result in failures caused by out of order processing in other VNFs in the VSN. If a VNF is moved to a different data center, it may no longer have connections with sufficient bandwidth or with sufficiently small latency to avoid causing processing errors within the VSN. Thus, traffic flow through virtual entities of a VSN, VSN performance, and VSN inter-dependency can be significantly affected by the migration of individual virtual entities. In this respect, physical proximity of the components running the virtual entities is typically beneficial. However, in methods aiming to migrate multiple virtual entities together, these aspects, and in particular how ensure that the inter-dependency of VNFs is accounted for, is often not sufficiently considered.

In the above context, "physical proximity" of virtual entities refers to virtual entities that are instantiated upon physical processing resources that are topologically close. This allows for entities that can be connected with low latency and high bandwidth connections. Typically, this can mean that they are instantiated upon resources in the same data center, in the same server rack, or even within a server within the same rack. In other situations, resources allocated to a VNF can be drawn from different data centers that are topologically connected to each other through a high speed low latency connection. Although during a migration, two VNFs that may be topologically close to each other may have a greater topological distance, the migration of a complete VSN can be designed to maintain a suitable connection after both have been migrated.

Migration methods for hardware-based sliced network entities include a solution for migrating a virtual router running border gateway protocol (BGP) or open shortest path first (OSPF). That introduces orchestration and ordering mechanisms for migrating virtual routers representing a collection of physical routers or sliced sub-units of these routers.

Methods and systems for live migration of a stateful VSN can be used to allow at least one of:

dynamic movement of one or more virtual entities each running one or more applications, entirely or partially, from being supported at one physical location to another physical location (this can be helpful for maintenance of a data center);

balancing a workload distribution among virtual entities so as to prevent overloads or hot spots;

consolidating active VNFs on a set of servers to reduce electrical power consumption;

upgrading or overhauling hardware or software in a data center;

preventing service stoppage during a natural disaster (e.g., flood or hurricane);

migrating entire/partial units or workloads of virtual gateways and network functions to operate physically, or topologically closer to where user applications and/or other virtual entities are run, which may reduce latency or otherwise improve performance;

migrating workloads of virtual gateways and partial workloads of virtual gateways to operate closer to where user applications and/or other virtual entities are run, to reduce latency or otherwise;

migrating NFs to operate closer to where user applications and/or other virtual entities are run, to improve performance;

distributing processing in the network to prevent overloads at some locations caused by a demanding application, by moving virtual entities required by an application or tenant to another location, where a tenant is a user or a group of users, such as a customer organization, that shares common access to and privileges within an application instance;

performing any of the above together, to improve performance;

balancing the workload of network traffic to reduce network costs and over-provisioning of the network.

Methods according to embodiments can allow live migration of a stateful VSN, while addressing or mitigating at least one of: Per-Connection Consistency (PCC), VNF policy enforcement, in-order packet delivery, and failure tolerance.

In the context of migrating VNFs within a VSN, ensuring PCC refers to maintaining the connection states of the initial VNFs during their migration, up until the VNFs have been migrated to the destination. In a live migration, these connection states should be maintained, because losing them would violate desired transparency requirements.

In-order packet delivery refers to processing packets in a given order (regardless of how they were migrated). In some systems, processing packets in the order in which they enter a chain of processing entities is required. When packets are processed out of order, for example by an intrusion detection system, it may result in a reduced accuracy in the detection of an attack. Out of order processing of packets may be caused by the migration of some of the network elements performing one step of a process but not others. If packets are assigned in sequence to different network entities, and one of these entities is migrated to a different physical network, i.e., from a first set of resources within a first data center to a second set of physical resources within a second data center, the output of the virtual entity may be received by the next step out of order. Additionally, if some but not all of these entities are migrated, there will be differential latency to their operation because of packet delivery delay caused by a change in the server location for these entities.

VNF policy enforcement refers to ensuring that packets are processed by a defined set of VNFs, and in some cases in a particular order and within defined time limits. Whether there is a migration occurring or not, packets should pass through the VNFs according to a policy associated with the VSN.

Failure tolerance refers to tolerating unexpected failures that might occur during the migration. In the event of a failure, an embodiment should be able to seamlessly continue processing packets and try to continue its operation.

Embodiments of a system for migrating VNFs within a VSN can include two types of components cooperating to realize live migration of a stateful VSN: a logically centralized orchestrator unit, i.e., an orchestrator, and local migration agents (LMA). Typically, there would an LMA associated with each computing location. In some embodiments, an LMA can be a virtual function that is instantiated upon resources within the same data center as the VNFs. One instance of an LMA, referred to as a source LMA, can be instantiated within the data center associated with the source physical location, while a second instance of an LMA, referred to as a destination LMA, can be instantiated within a data center associated with the destination physical location. This allows an LMA to be present within both virtual computing environments.

Figure 2:
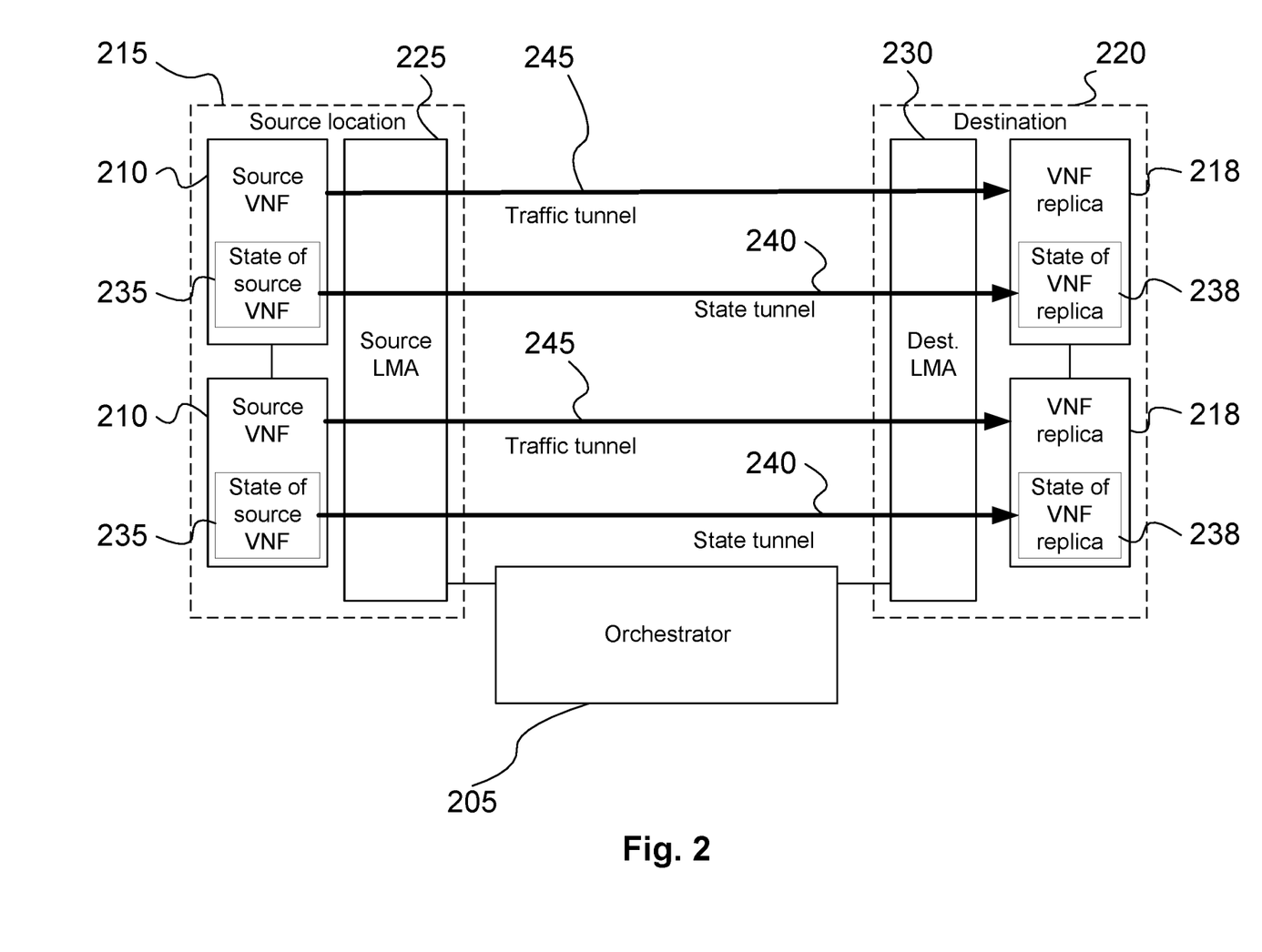
FIG. 2 illustrates a direct acyclic graph (DAG)-structured virtual sub-networks (VSN) of virtual entities and its replica, according to an embodiment.

FIG. 2 illustrates an example of a system architecture for realizing live migration of two VNFs. A basic system includes an orchestrator 205, at least one source VNF 210 at a source physical location 215, at least one replica VNF 218, that is to be instantiated at a destination physical location 220, a source LMA 225 at the source physical location 215, and a destination LMA 230 at the destination physical location 220. Each source VNF 210 has a set of state parameters, collectively referred to as a state 235. The state 235 defines the current operating condition of the VNF 210, and any VNF of the same VNF type given the state 235 can be considered to be indistinguishable from the source VNF 210. This information defining the state 235 can be transmitted like any other data. This allows for the source VNF 210 to be migrated to the destination physical location through a process of instantiating a replica VNF 218 of the same type as the source VNF 210 and then transmitting the information defining the state 235 of source VNF 210. This transmitted information can then be associated with replica VNF 218 so that the migration of the source VNF 210 can be completed.

During a migration, the orchestrator 205 is responsible for three tasks: obtaining or allocating resources in the second physical location that can be used to instantiate replica VNFs, managing an overlay network, and directing the LMAs. The LMAs 225, 230 are responsible for two main tasks: executing each migration and enforcing the use of overlay networks.

Initially, the orchestrator 205 makes a request for processing resources and network resources to be allocated at the destination 220, and then allocates those resources to instantiate, a corresponding VNF replica 218 at the destination 220 network of servers for each VSN at the source location 215 that is to be migrated. The orchestrator 205 can configure the newly allocated VNF replica 218 according to the source VNF's functionality. The VNF is only considered to be migrated after the transfer of the state 235 of the source VNF.

Replica VNFs 218 can be instantiated at the destination physical location 220 upon resources requested by the orchestrator 205. This instantiation of replica VNFs 218 along with configuring connections between the instantiated VNFs 218 can be performed before other steps in the method. This may reduce the time required between configuration of different VNFs as the instantiation and some basic configuration has already occurred. This can effectively replicate the VSN, without state information, at the destination physical location 220. Thus, the instantiation of any given VNF can occur before migration of the state information is even considered.

With the replica VNF 218 instantiated upon resources at the destination physical location 220, the orchestrator 205 can instruct the source LMA 225 and the destination LMA 230 to configure, a state tunnel 240 and a traffic tunnel 245 associated with the pairing of the source VNF 210 and its respective VNF replica 218. The state tunnel 240 is used for transferring state parameter packets from the source VNF 210 towards the replica VNF 218 at the destination physical location 220. The traffic tunnel 245 can be used for transferring traffic packets received at the source physical location 220 to the destination physical location 220 so that they can be handled by the replica VNF 218 after it has been configured. Both tunnels can be configured to transmit packets with a higher priority than other network traffic. This allows VNF state traffic within a state tunnel 240 to be handled differently than regular traffic at routers and switches along the path between the source 215 and destination 220 physical locations. The prioritization of the transmitting of information characterizing state 235 can reduce the likelihood that traffic congestion on physical data links between the source 215 and destination 220 physical locations will delay the migration and increase any temporal latency in packet handling. The orchestrator 205 can direct the destination LMA 230 to buffer traffic packets received over traffic tunnel 245 until the replica VNF 218 is ready to process the packets. The state tunnel 240 and the traffic tunnel 245 can be configured to transfer data with a priority greater than the priority of regular packet traffic on links connecting the servers at the source physical network 215 and servers at the destination physical network 220.

At a given point in a migration process, the source VNF 210 has been selected by the orchestrator 205 for migration, however, the VNF 210 can still receive packets for processing, and may still be processing packets. The processing of packets can change the state 235 of source VNF 210. If this is done after the state 235 has been transmitted over state tunnel 240 towards VNF replica 218, it will result in there being a state mismatch between the source VNF 210 and the VNF replica 218. To prevent a state change from occurring after state 235 has been transferred to the VNF replica 218 but before the completion of the migration process, the orchestrator can instruct the source LMA 225, to stop the source VNF 218 from processing traffic packets. The source LMA 225 can send the source VNF 210 an instruction to cease processing traffic packets. The source VNF's state 235 will thus effectively be locked. In some embodiments, the source VNF 210 may be allowed to finish processing any packets queued before receipt of such an instruction. The state 235 of the source VNF 210 can be sent towards the replica VNF 218 after it has completed the processing of packets in a local queue.

In a VSN with many VNFs, the orchestrator 205 may stop VNFs within the VSN on e at a time, or in small numbers instead of trying to migrate the entire VSN in one set of instructions. The Orchestrator 201, aware of the ability of the VSN to be modeled as a DAG, can select a VNF 210 for migration that is represented as a leaf node within the representative DAG. This can be referred to as bottom-up ordering (bottom-up when represented visually as in FIG. 1d), i.e., from the leaf nodes to the root nodes. This bottom-up ordering heuristic is an improvement for higher migration performance with less memory buffering than top-down ordering, because once low-level nodes are migrated and ready to process data, they do not need to buffer the incoming packets from high-level nodes. Functionally top-down or mixed ordering would also still work. After a replica VNF 218 has been instantiated and configured, the state information of the source VNF 210 can be copied to the destination physical location 220 so that replica VNF 218 can be updated so that it has the same state as the source VNF 210. This allows the replica VSN to be configured in an orderly manner. In other words, the VNF states can be transferred successively beginning with a source VNF from the VSN, representing a leaf node of the DAG, and then continuing with successive parent nodes, and finishing with a root node of the VSN.

After a source VNF 210 has stopped processing traffic, the state of the VNF 210 can be considered to be fixed. The orchestrator 205 can directs the source LMA 225 to initiate the transfer of the state information 235 of the source VNF 210 towards the replica VNF 218. This transfer can be performed using state tunnel 240. This transferring of the state information 235 allows a configured VNF 218 to have the same state as the source VNF 210. This transfer results in replica VNF 218 having state information. The configuration of the replica VNF 218 can identify the replica VNF in the replica VSN that should receive the results of processing packets.

Although the instant discussion relates to the migration of a single VNF, it should be understood that orchestrator 205 can direct several VNFs to be transferred simultaneously, via corresponding state tunnels. With already existing and partially configured replica VNFs at the destination physical location 220, the orchestrator 205 can pause processing at source VNFs at the source physical location 215, and initiate the transfer of state parameters towards the replica VNFs at the destination physical location 220. However simultaneous transfers can cause congestion in the network and may increase the operation's latency. The orchestrator can therefore have the states transferred in a bottom-up ordering, similarly to how the source VNFs were stopped from processing. In some embodiments, all VNFs corresponding to leaf nodes in a DAG in the source VSN may be selected for migration at a time. This moving of layers of the DAG in a single migration wave allows for the migration of parallel VNFs that may be receiving packets from a load balancing function at a parent node.

When the source VNF state 235 is received over tunnel 240, the source VNF state 235 is stored as a replica VNF state 238. This results in the replica VNF 218 being a migration of the source VNF 210.

After receiving state parameters, a destination VNF 218 is almost ready to start processing the traffic packets that were buffered before they could be delivered to the source VNF 210. In some embodiments, these buffered packets are delivered to the destination LMA 230 over traffic tunnel 245. When the replica VNF 218 is configured for packet processing and for delivering the results of the packet processing, typically to a VNF representing a child node within the migrated or partially migrated DAG. However, to prevent traffic packet reordering, the orchestrator can direct (via the destination LMA) the VNF replica to ensure maintenance of traffic packet ordering by verifying whether more traffic parameter packets will be received from the traffic tunnel 245. Packets will continue to be delivered over a traffic tunnel 245 until the VNF representing the parent node within in the DAG has been migrated, at which point the state tunnel 240 and traffic tunnel 245 can be torn down.

The orchestrator 205 can transmit an instruction to the destination LMA 230 to imitate traffic processing at the VNF replicas 218. start processing previously buffered traffic packets. At least one of the source LMA 225 and destination LMA 230 can be instructed to handle the redirection of traffic packets from the source VNF 210 to the VNF replica 218. At this point, packets from the parent node of the source VNF 235 are sent to the replica VNF 218, and are processed there. This completes the migration of the source VNF 210 to the destination physical location 220 where it exists as VNF replica 218. After the first migration, the DAG representing the VSN at the source physical location 215 can be considered to be modified, as the VNF representing the selected leaf node of the DAG has been removed. The Orchestrator 205 can continue the VSN migration by repeating the above process, starting with the selection of a leaf node. If a complete set of leaf nodes was previously selected, then the parent node(s) of the previously selected nodes would be the new leaf nodes. As this process is repeated, the VSN is migrated VNF by VNF, or level by level. The dependencies between VNFs can be accommodated, with each set of migrations introducing some latency during the migration.

Although the embodiment shown in FIG. 2 is a case for two source VNFs, methods according to embodiments can apply to VSNs made up of any number of different levels of virtual entities. The VNFs being migrated can be implanted in any number of different types of virtual entities, including VNFs instantiated upon VMs or within containers, or even VNFs that are virtualized representations of physical entities that are created through slicing or any other such virtualization technique.

When a migration of a VNF from the source physical location 215 to the destination physical location 220, the orchestrator 205 can instruct source LMA 225 and destination LMA 230 to use a traffic tunnel 245 to move data packets from a parent node to a child node.

When a VSN has a structure that can be modeled as a DAG, and VNFs of the VSN can be migrated successively in a bottom-up (leaf to root) fashion. To avoid traffic induced delays between VNFs at the source physical location 215 and VNFs that have been migrated to the destination physical location 220, the source LMA 225 and destination LMA 230 can maintain a traffic tunnel 245 to allows packets to be sent from a parent node to a child node at a different location. This traffic tunnel 245 can be a reuse of the traffic tunnel 245 used to move packet traffic from the source VNF 210 towards the destination VNF 218. In some embodiments, the state traffic tunnel 240 can be maintained, but if all state information 235 associated with the source VNF 210 has been transferred during the migration process, this tunnel 240 can be torn down at the end of the VNF migration process. When additional VNFs are selected for migration, new state tunnels 240 and traffic tunnels 245 can be created and uniquely associated with the source and replica VNFs that are being migrated. As noted earlier, the traffic tunnel 245 used between a source VNF 210 and replica VNF 218 can be reused for traffic between the parent node and migrated child node. This reuse can be done by not tearing down the source VNF 210 at the end of the migration, and having the source LMA 225 redirect traffic received by the source VNF 210 into tunnel 245. At the destination LMA 230 packet buffering at the terminal end of tunnel 245 may be employed to allow for maintaining packet ordering, and to aid in differentiating packets associated with the replica VNF 218. Similarly, a destination LMA 230 can be configured to identify whether a received packet is from a state tunnel 240 or a packet tunnel 235.

Figure 3:
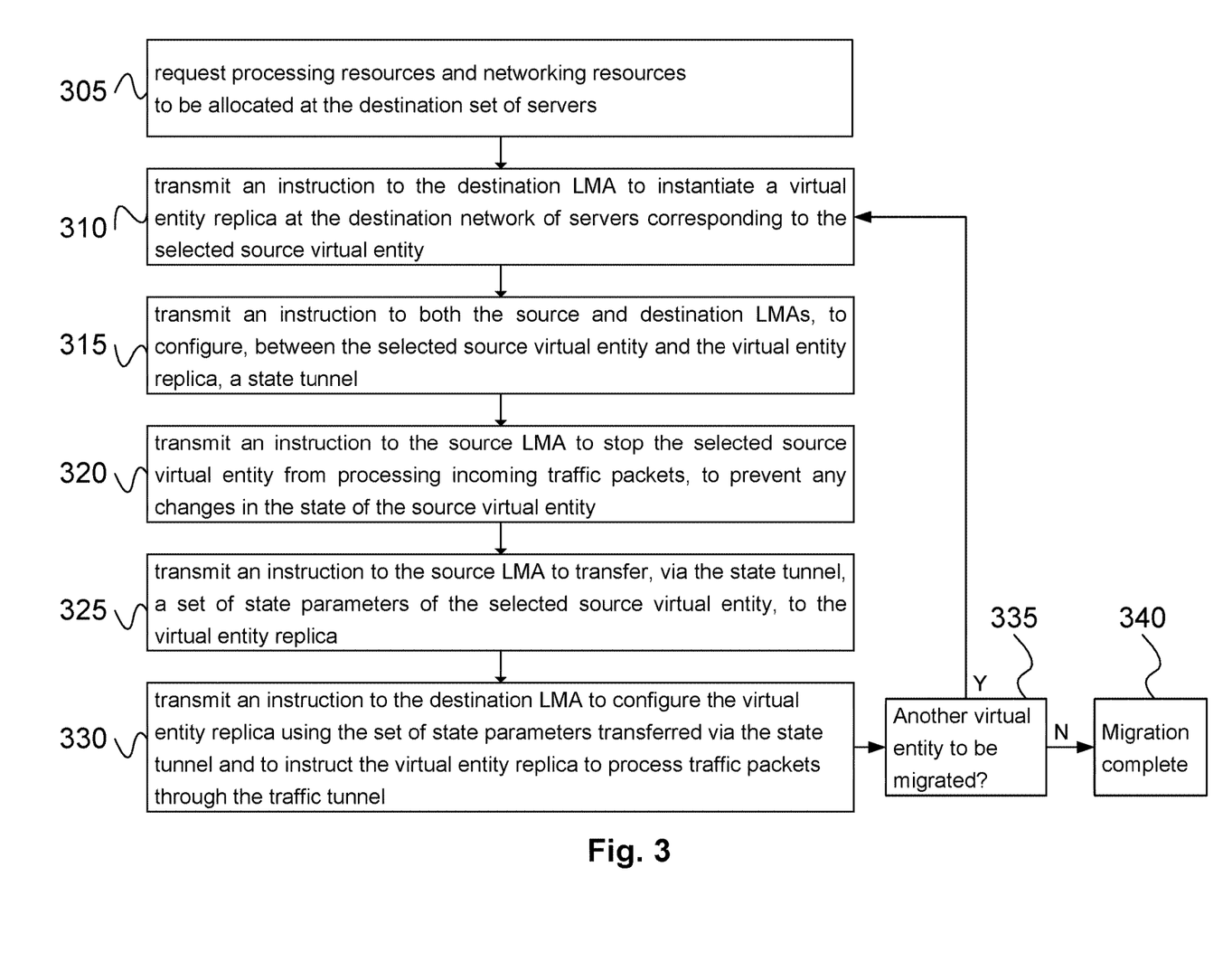
FIG. 3 is a flowchart for a method to realize live migration of a stateful VSN, according to an embodiment.

FIG. 3 is a flowchart illustrating a method for execution at an orchestrator 205. The method allows the orchestrator 205 to instruct the live migration of a stateful VSN that can be modeled as a DAG, according to an embodiment. Initially, an orchestrator can request and allocate 305 processing and networking resources at a destination set of servers. Then, it can select a source virtual entity from the VSN for migration to the destination network of servers, the selected source virtual entity being a leaf node within the DAG. It should be understood by those skilled in the art that the resources requested and allocated in step 305 can be used to support a replica virtual entity at the destination physical location, to allow for support of the migration of the selected source virtual entity. As described above, the virtual entities can be VNFs or other such virtual entities. The VNFs may be implemented upon resources allocated to one or more of a virtual machine or a container. Then, the orchestrator can transmit 310 an instruction to the destination LMA to instantiate a virtual entity replica at the destination network of servers corresponding to the selected source virtual entity. Then, the orchestrator can transmit 315 an instruction to both a source LMA at the source network of servers and the destination LMA, to configure, between the selected source virtual entity and the virtual entity replica, a state tunnel for transferring a set of state parameters, and a traffic tunnel for transferring traffic packets. Then, the orchestrator can transmit 320 an instruction to the source LMA to stop or prevent the selected source virtual entity from further processing incoming traffic packets, to prevent any changes in the state of the source virtual entity. Then, the orchestrator can then transmit 325 an instruction to the source LMA to transfer, via the state tunnel, a set of state parameters of the selected source virtual entity, to the virtual entity replica. The orchestrator can then transmit 330 an instruction to the destination LMA to configure the virtual entity replica using the set of state parameters transferred via the state tunnel and to instruct the virtual entity replica to process traffic packets through the traffic tunnel. At this point, the orchestrator can transmit an instruction to the source LMA to redirect traffic packets addressed to the selected source virtual entity over the traffic tunnel to the virtual entity replica, which effectively reduces the source virtual entity to being a forwarding node that sends incoming traffic packets to the virtual entity replica, using the traffic tunnel. This process can be repeated 335 for each virtual entity of the source VSN, until the VSN migration is complete in step 340. The VSN migration can be considered as complete when all VNFs within the VSN are migrated, or when a subset of the VNFs within the VSN are migrated. If a subset of the VNFs are migrated, the migration process can be considered to be complete if the migration has satisfied predefined requirements, such as a reduction in processing load at the source physical network. This process can begin with a source virtual entity that is a leaf node within the DAG representing the VSN. The originally selected VNF can be removed from the source DAG when it has been migrated. To continue the migration, another leaf node of the DAG can be selected. If there is a single leaf node, then next node would be a parent node of the originally selected node within the VSN. The steps recited above with respect to FIG. 3 are then repeated for subsequent selected nodes; eventually finishing with a root node of the VSN. To trigger migration of a subsequent virtual entity, the orchestrator can receive from the source virtual entity, a signal to instantiate a state tunnel and a traffic tunnel, the state tunnel and traffic tunnel being from a second source virtual entity at a parent node of the node hosting the source virtual entity, to a second virtual entity replica at a corresponding second parent node in the VSN replica.

Benefits of embodiments over prior art can be illustrated with the following examples.

Systems and methods according to embodiments can allow for a reduction in the possibility that during a VSN migration, critical network states and packets are not lost. By having an orderly process that reduces the likelihood of packet misordering and ensures that packets are buffered and transmitted over defined tunnels reduces the likelihood that these packets will be dropped.

Systems and methods according to embodiments can ensure that during a VSN migration, virtual entities such as VNFs that may be provided by software executed within at least one of a VM and a container, reach their destination. By ensuring that the resources specifically required for the allocation of a virtual entity before the instantiation of the virtual entity, there can be a reduced likelihood that the resources needed for the migration of the multiple entities within the VSN are re-allocated during the migration.

Systems and methods according to embodiments can ensure that the migration of one or more virtual entities take a defined amount of time to finish. Otherwise, a migration can take too long to be completed, and some cases, it may never converge.

Systems and methods according to embodiments can ensure that following a migration, network states are consistent, packets are not dropped, and packets are ordered as intended. Otherwise, inconsistent networks links and processing allocations may be inconsistent, and packets can be dropped or become disordered.

Systems and methods according to embodiments can facilitate the migration of a DAG-structured VSN of multiple virtual entities, by ensuring an efficient and consistent orchestration across many levels of the DAG-structured VSN. Otherwise, it can be difficult for orchestration to be efficient and consistent across many different levels.

Systems and methods according to embodiments can provide an orchestration for the migration of virtual entities such as VNFs, VMs, workloads of VNFs, workloads of virtual gateways, and/or an orchestration for migrating a user's (e.g., a tenant of network entities) applications and VMs together. This can ensure reliability and live state consistency, as well as a reduction of migration overhead, and a reduction of convergence time. Together, these improvements can account for better performance and better recovery from failures and/or errors.

Systems and methods according to embodiments can provide for the migration of a DAG-structured VSN, level-by-level, from the highest level (leaf nodes) to the lowest level nodes (root nodes), i.e., in a reversed depth-first order (i.e., bottom-up, visually). This can allow preserving existing states and updating new states. This can also minimize buffering time for each packet and consequently reduce the total inflight time of each packet during a multi-layer migration.

Systems and methods according to embodiments can provide for network prioritization while transferring states. By employing end-to-end tunnels configured with high priority network bands to expedite a migration process, methods according to embodiment can ensure that a total migration time is limited and therefore, that the effects of the migration on the applications are also limited. This can include a limited, total buffering time and limited buffering requirements.

Systems and methods according to embodiments can provide for end-to-end tunnels between virtual entities of a source VSN and virtual entities of a destination VSN. This can ensure that packets are not lost and that the virtual entities' states are safely being migrated to the destination.

Systems and methods according to embodiments can provide for a high priority buffer at each virtual entity of a destination VSN. Such buffers can allow a distinction between packets received from different paths, and therefore ensure that the order of packets during a migration is kept, i.e., that migration does not result in packets being reordered.

Figure 4:
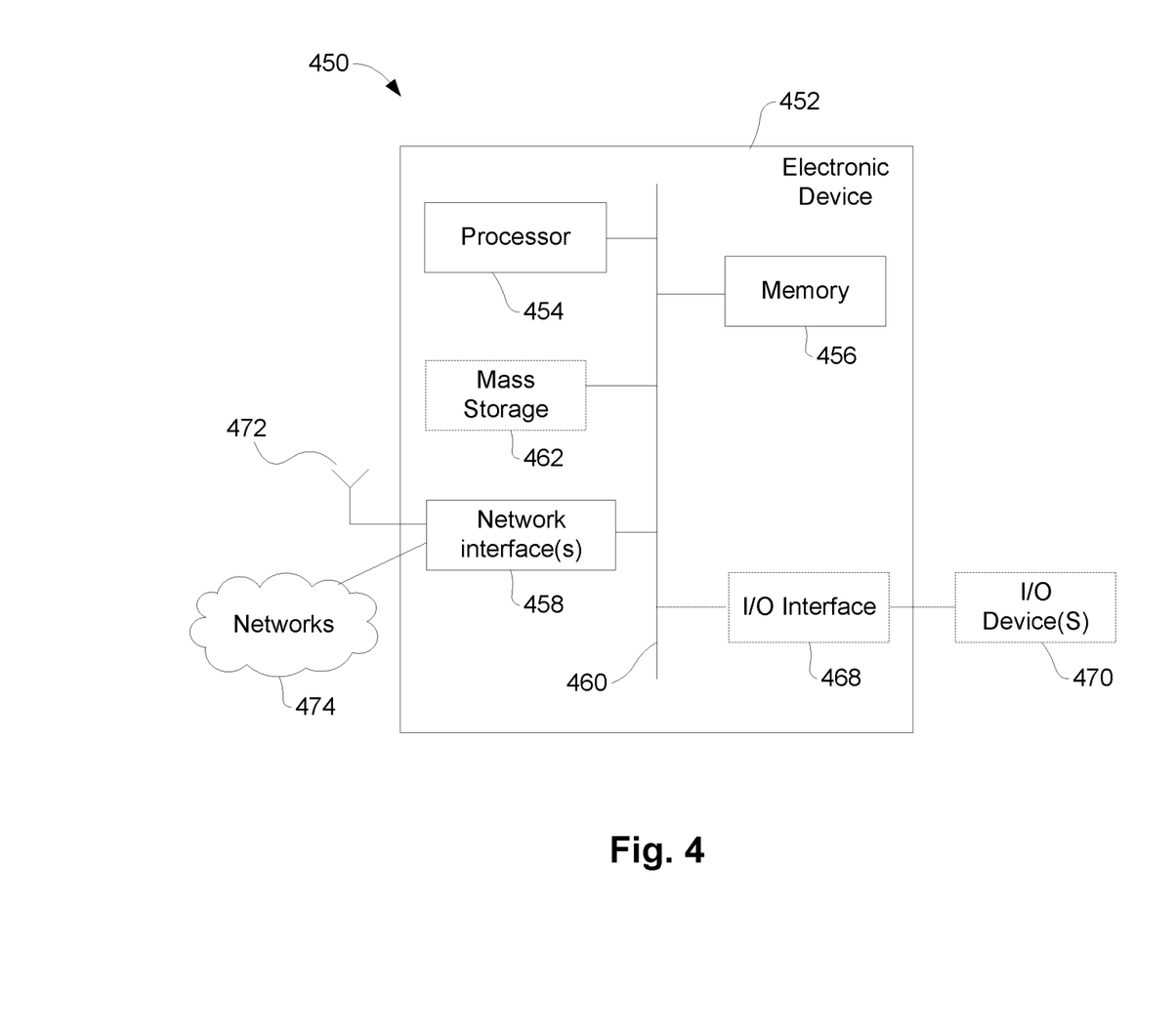
FIG. 4 is a block diagram of an electronic device (ED) illustrated within a computing and communications environment that may be used for implementing the devices and methods disclosed herein.

FIG. 4 is a block diagram of an electronic device (ED) 452 illustrated within a computing and communications environment 450 that may be used for implementing the devices and methods disclosed herein, such as an orchestrator and local migration agents for implementing a VSN migration from one physical location to another. An orchestrator can be implemented as software executed by ED 452. In the illustrated embodiment of FIG. 4, ED 452 may include a processor 454, such as a central processing unit (CPU), and may further include specialized processors such as a field programmable gate array (FPGA) or other such processor, a memory 456, a network interface 458 and a bus 460 to connect the components of ED 452. ED 452 may optionally also include components such as a mass storage device 462, and an I/O interface 468 (shown in dashed lines).

The memory 456 may comprise any type of non-transitory system memory, readable by the processor 454, such as static random-access memory (SRAM), dynamic random-access memory (DRAM), synchronous DRAM (SDRAM), read-only memory (ROM), or a combination thereof. In an embodiment, the memory 456 may include more than one type of memory, such as ROM for use at boot-up, and DRAM for program and data storage for use while executing programs. The bus 460 may be one or more of any type of several bus architectures including a memory bus or memory controller, a peripheral bus, or a video bus.

The electronic device 452 may also include one or more network interfaces 458, which may include at least one of a wired network interface and a wireless network interface. A network interface 458 may include a wired network interface to connect to a network 474, and also may include a radio access network interface 472 for connecting to other devices over a radio link. The network interfaces 458 allow the electronic device 452 to communicate with remote entities such as those connected to network 474.

The mass storage 462 may comprise any type of non-transitory storage device configured to store data, programs, and other information and to make the data, programs, and other information accessible via the bus 460. The mass storage 462 may comprise, for example, one or more of a solid-state drive, hard disk drive, a magnetic disk drive, or an optical disk drive. In some embodiments, mass storage 462 may be remote to the electronic device 452 and accessible through use of a network interface such as interface 458. In the illustrated embodiment, mass storage 462 is distinct from memory 456 where it is included and may generally perform storage tasks compatible with higher latency but may generally provide lesser or no volatility. In some embodiments, mass storage 462 may be integrated with a heterogeneous memory 456.

In an embodiment, an orchestrator for supporting and migrating a virtual sub-network (VSN) of source virtual entities for processing traffic packets, from a source network of servers to a destination network of servers, can comprise a network interface for transmitting and receiving data, a machine readable memory for storing instructions, and at least one processor for executing instructions stored in the memory that when executed, configure the orchestrator to select a source virtual entity from the VSN for migration to the destination network of servers, the VSN structured as a direct acyclic graph (DAG) and the selected source virtual entity being a leaf node within the DAG; transmit an instruction to a destination local migration agent (LMA) at the destination network of servers to instantiate a virtual entity replica at the destination network of servers corresponding to the selected source virtual entity; transmit an instruction to both a source LMA at the source network of servers and the destination LMA, to configure, between the selected source virtual entity and the virtual entity replica, a state tunnel for transferring a set of state parameters, and a traffic tunnel for transferring traffic packets; transmit an instruction to the source LMA to stop the selected source virtual entity from processing traffic packets; transmit an instruction to the source LMA to transfer, via the state tunnel, a set of state parameters of the selected source virtual entity, to the virtual entity replica; transmit an instruction to the destination LMA to configure the virtual entity replica using the set of state parameters transferred via the state tunnel and to instruct the virtual entity replica to process traffic packets; and transmit an instruction to the source LMA to redirect traffic packets addressed to the selected source virtual entity over the traffic tunnel to the virtual entity replica. The network interface 474 and I/O interface 468 can also allow for storage and/or processing to occur externally.

In some embodiments, electronic device 452 may be a standalone device, while in other embodiments electronic device 452 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage, and connectivity resources (along with other resources within the network) can be divided between different sub-networks, in some cases in the form of a resource slice. If the resources across a number of connected data centers or other collection of nodes are sliced, different network slices can be created.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations, or equivalents that fall within the scope of the present invention.

What is claimed is:

1. A method of migrating a virtual sub-network (VSN) of source virtual entities for processing traffic packets from a source network of servers to a destination network of servers, by an orchestrator, the method comprising:
   selecting a source virtual entity from the VSN for migration to the destination network of servers, the VSN structured as a direct acyclic graph (DAG) and the selected source virtual entity being a leaf node within the DAG;
   transmitting an instruction to a destination local migration agent (LMA) at the destination network of servers to instantiate a virtual entity replica at the destination network of servers corresponding to the selected source virtual entity;
   transmitting an instruction to both a source LMA at the source network of servers and the destination LMA, to configure, between the selected source virtual entity and the virtual entity replica, a state tunnel for transferring a set of state parameters, and a traffic tunnel for transferring traffic packets;
   transmitting an instruction to the source LMA to stop the selected source virtual entity from processing traffic packets;
   transmitting an instruction to the source LMA to transfer, via the state tunnel, a set of state parameters of the selected source virtual entity, to the virtual entity replica;
   transmitting an instruction to the destination LMA to configure the virtual entity replica using the set of state parameters transferred via the state tunnel and to instruct the virtual entity replica to process traffic packets; and
   transmitting an instruction to the source LMA to redirect traffic packets addressed to the selected source virtual entity over the traffic tunnel to the virtual entity replica.

2. The method of claim 1, further comprising removing the selected source virtual entity from the DAG and repeating the method until a replica of the VSN has been instantiated and configured at the destination network of servers.

3. The method of claim 1, wherein instantiating a virtual entity replica at the destination network of servers, comprises:
   transmitting a request for processing resources and networking resources to a resource manager at the destination network of servers, and
   instantiating the corresponding virtual entity replica on resources allocated in response to the transmitted request.

4. The method of claim 1, wherein at least one of the source virtual entities is a virtual network function (VNF).

5. The method of claim 1, further comprising directing the destination LMA to buffer traffic packets received from the destination LMA's traffic tunnel.

6. The method of claim 1, further comprising directing the destination LMA to buffer traffic packets received from the destination LMA's state tunnel.

7. The method of claim 1, wherein the state tunnel and the traffic tunnel are configured to transfer data with a priority greater than the priority of regular packet traffic in the source network of servers and the destination network of servers.

8. The method of claim 1, the method wherein the method is performed over a time interval for each virtual entity and the time interval for each entity overlaps with a time interval for another entity.

9. The method of claim 1, wherein each destination LMA is configured to determine whether a traffic packet is from a state tunnel or a traffic tunnel.

10. The method of claim 1, wherein each destination LMA is configured to determine which source node of the VSN a traffic packet is received from.

11. The method of claim 1, further comprising:
    selecting a second source virtual entity from the VSN in response to receipt of a prompt from the selected source virtual entity indicating that it has been migrated to the destination network; and
    repeating the steps of transmitting an instruction for the selected second source virtual entity.

12. The method of claim 1, further comprising transmitting an instruction to the destination LMA to verify that all state parameters from the source virtual entity have been received prior to instructing the virtual entity replica to begin processing traffic packets.

13. The method of claim 1, further comprising transmitting an instruction to the destination LMA to allow each virtual entity replica to process buffered traffic packets obtained from the corresponding tunnel.

14. The method of claim 1, wherein at least one of the source virtual entities is a virtual machine (VM).

15. A system for supporting and migrating a virtual sub-network (VSN) of source virtual entities for processing traffic packets, from a source network of servers to a destination network of servers, the system comprising:
    a source local migration agent (LMA) at the source network of servers;
    a destination LMA at the destination network of servers; and
    a machine readable memory for storing instructions, and
    at least one processor for executing instructions stored in the memory that when executed, configure the at least one processor to:
    select a source virtual entity from the VSN for migration to the destination network of servers, the VSN structured as a direct acyclic graph (DAG) and the selected source virtual entity being a leaf node within the DAG;
    transmit an instruction to a destination local migration agent (LMA) at the destination network of servers to instantiate a virtual entity replica at the destination network of servers corresponding to the selected source virtual entity;
    transmit an instruction to both a source LMA at the source network of servers and the destination LMA, to configure, between the selected source virtual entity and the virtual entity replica, a state tunnel for transferring a set of state parameters, and a traffic tunnel for transferring traffic packets;
    transmit an instruction to the source LMA to stop the selected source virtual entity from processing traffic packets;
    transmit an instruction to the source LMA to transfer, via the state tunnel, a set of state parameters of the selected source virtual entity, to the virtual entity replica;
    transmit an instruction to the destination LMA to configure the virtual entity replica using the set of state parameters transferred via the state tunnel and to instruct the virtual entity replica to process traffic packets; and transmit an instruction to the source LMA to redirect traffic packets addressed to the selected source virtual entity over the traffic tunnel to the virtual entity replica.

16. An orchestrator for supporting and migrating a virtual sub-network (VSN) of source virtual entities for processing traffic packets, from a source network of servers to a destination network of servers, the orchestrator comprising a network interface for transmitting and receiving data, a machine readable memory for storing instructions, and at least one processor for executing instructions stored in the memory that when executed, configure the orchestrator to:

select a source virtual entity from the VSN for migration to the destination network of servers, the VSN structured as a direct acyclic graph (DAG) and the selected source virtual entity being a leaf node within the DAG;

transmit an instruction to a destination local migration agent (LMA) at the destination network of servers to instantiate a virtual entity replica at the destination network of servers corresponding to the selected source virtual entity;

transmit an instruction to both a source LMA at the source network of servers and the destination LMA, to configure, between the selected source virtual entity and the virtual entity replica, a state tunnel for transferring a set of state parameters, and a traffic tunnel for transferring traffic packets;

transmit an instruction to the source LMA to stop the selected source virtual entity from processing traffic packets;

transmit an instruction to the source LMA to transfer, via the state tunnel, a set of state parameters of the selected source virtual entity, to the virtual entity replica;

transmit an instruction to the destination LMA to configure the virtual entity replica using the set of state parameters transferred via the state tunnel and to instruct the virtual entity replica to process traffic packets; and transmit an instruction to the source LMA to redirect traffic packets addressed to the selected source virtual entity over the traffic tunnel to the virtual entity replica.

* * * * *

UNITED STATES PATENT AND TRADEMARK OFFICE
CERTIFICATE OF CORRECTION

Page 1 of 1

PATENT NO. : 11,895,013 B1
APPLICATION NO. : 18/099701
DATED : February 6, 2024
INVENTOR(S) : Ganjali et al.

It is certified that error appears in the above-identified patent and that said Letters Patent is hereby corrected as shown below:

On the Title Page

"(72) Inventors: Yashar Ganjali, Kanata (CA); Zhenhua Hu, Kanata (CA); Sepehr Abbasi Zadeh, Kanata (CA); Soheil Abbasloo, Toronto (CA); Parsa Pazhooheshu, Toronto (CA); Farid Zandi, Toronto (CA)"

Should read:

---(72) Inventors: Yashar Ganjali, Kanata (CA); Zhenhua Hu, Kanata (CA); Sepehr Abbasi Zadeh, Kanata (CA); Soheil Abbasloo, Toronto (CA); Parsa Pazhooheshu, Toronto (CA); Farid Zandi Shafagh, Toronto (CA)---

Signed and Sealed this
Fourteenth Day of May, 2024

Katherine Kelly Vidal
*Director of the United States Patent and Trademark Office*